United States Patent
Gottumukkala et al.

(10) Patent No.: US 9,088,580 B2
(45) Date of Patent: Jul. 21, 2015

(54) ACCESS CONTROL BASED ON USER AND SERVICE

(75) Inventors: Sunil P. Gottumukkala, Redmond, WA (US); Thomas C. Jones, Sammamish, WA (US); Sunil S. Kadam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1137 days.

(21) Appl. No.: 12/651,199

(22) Filed: Dec. 31, 2009

(65) Prior Publication Data

US 2011/0162057 A1 Jun. 30, 2011

(51) Int. Cl.
| | |
|---|---|
| H04L 9/32 | (2006.01) |
| G06F 21/24 | (2006.01) |
| H04L 29/06 | (2006.01) |
| G06F 21/41 | (2013.01) |
| G06F 21/62 | (2013.01) |

(52) U.S. Cl.
CPC .......... *H04L 63/101* (2013.01); *G06F 21/6218* (2013.01); *H04L 63/102* (2013.01); *G06F 21/41* (2013.01); *G06F 21/62* (2013.01); *G06F 2221/2141* (2013.01); *H04L 9/3213* (2013.01); *H04L 63/0815* (2013.01); *H04L 63/10* (2013.01)

(58) Field of Classification Search
CPC ....... G06F 21/335; G06F 21/41; G06F 21/62; G06F 21/6218; G06F 2221/2141; H04L 63/0815; H04L 63/10; H04L 63/101; H04L 9/3213
USPC ................................ 726/4–6, 8, 10; 709/229
See application file for complete search history.

(56) References Cited

U.S. PATENT DOCUMENTS

| | | | | |
|---|---|---|---|---|
| 5,889,952 | A  * | 3/1999 | Hunnicutt et al. ............ | 709/219 |
| 6,754,829 | B1   | 6/2004 | Butt et al. | |
| 7,103,784 | B1 * | 9/2006 | Brown et al. ...................... | 726/9 |
| 7,185,047 | B1   | 2/2007 | Bate et al. | |
| 7,231,661 | B1 * | 6/2007 | Villavicencio et al. ........... | 726/4 |
| 7,360,082 | B1   | 4/2008 | Berthold et al. | |
| 7,434,048 | B1   | 10/2008 | Shapiro et al. | |
| 7,577,834 | B1 * | 8/2009 | Traversat et al. ............. | 713/156 |
| 2003/0177376 | A1 * | 9/2003 | Arce Velleggia et al. ..... | 713/189 |
| 2003/0212806 | A1 * | 11/2003 | Mowers et al. ............... | 709/229 |
| 2004/0034774 | A1 * | 2/2004 | Le Saint ........................ | 713/169 |
| 2004/0230831 | A1 * | 11/2004 | Spelman et al. .............. | 713/201 |

(Continued)

OTHER PUBLICATIONS

Howell, et al., "An Access-Control Calculus for Spanning Administrative Domains", Retreived at <<http://www1.cs.dartmouth.edu/~dfk/papers/howell:calculus-tr.pdf>>, 1999, pp. 1-36.

(Continued)

*Primary Examiner* — Jung Kim
*Assistant Examiner* — Theodore Parsons
(74) *Attorney, Agent, or Firm* — Timothy Churna; Kate Drakos; Micky Minhas (57) ABSTRACT

For a particular request to access a resource, both a user associated with the request and a service through which the request is made are identified. Whether requested access to a resource is permitted is determined based on a user associated with the requested access and a service through which the access is requested. This determination can be made based on an access control entry of an access control list corresponding to the resource, the access control entry identifying access to the resource that is permitted to the user when accessing the resource through the service.

23 Claims, 6 Drawing Sheets

(56) References Cited

U.S. PATENT DOCUMENTS

| | | | |
|---|---|---|---|
| 2005/0091655 A1* | 4/2005 | Probert et al. | 718/100 |
| 2005/0114677 A1* | 5/2005 | Kanai | 713/182 |
| 2005/0138362 A1* | 6/2005 | Kelly et al. | 713/156 |
| 2006/0021016 A1* | 1/2006 | Birk et al. | 726/10 |
| 2006/0074850 A1 | 4/2006 | Bouchet | |
| 2006/0184646 A1* | 8/2006 | Schmidt et al. | 709/218 |
| 2006/0294051 A1* | 12/2006 | Kapadia et al. | 707/1 |
| 2006/0294578 A1* | 12/2006 | Burke et al. | 726/2 |
| 2007/0016583 A1* | 1/2007 | Lempel et al. | 707/9 |
| 2007/0186112 A1* | 8/2007 | Perlin et al. | 713/182 |
| 2007/0208745 A1 | 9/2007 | Ture et al. | |
| 2007/0255841 A1* | 11/2007 | Chong | 709/229 |
| 2008/0086767 A1* | 4/2008 | Kulkarni et al. | 726/9 |
| 2009/0157627 A1 | 6/2009 | Arthursson | |
| 2009/0158425 A1* | 6/2009 | Chan et al. | 726/21 |
| 2009/0228967 A1* | 9/2009 | Gbadegesin et al. | 726/8 |
| 2009/0276840 A1* | 11/2009 | Cao et al. | 726/9 |
| 2010/0005511 A1* | 1/2010 | Maes | 726/4 |
| 2011/0026704 A1* | 2/2011 | Connelly et al. | 379/219 |
| 2012/0204221 A1* | 8/2012 | Monjas Llorente et al. | 726/1 |

OTHER PUBLICATIONS

Kane, Kevin Michael ., "Access Control in Decentralized, Distributed Systems", Retreived at<<https://www.lib.utexas.edu/etd/d/2006/kanek60698/kanek60698.pdf>>, Dec. 2006, pp. 178.

Yelmo, et al., "A User-Centric Service Creation Approach for Next Generation Networks", Retrieved at<<http://www.cs.adelaide.edu.au/~jyu/papers/NGN-08.pdf>>, May 12-13, 2008, pp. 8.

* cited by examiner

ACCESS CONTROL BASED ON USER AND SERVICE

BACKGROUND

Restricting access to computing resources, such as files in a file system, to particular users is oftentimes desired. One way such restrictions can be enforced is a user-based approach in which particular types of access to resources are granted to particular users. Although such user-based approaches can be beneficial, they are not without their problems. One such problem is that such approaches lack flexibility in the restricting of access to resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request for a particular type of access to a resource is received. A user associated with the request and a service through which the request is made are identified. A determination is made as to whether the particular type of access to the resource is permitted based at least in part on both the user associated with the request and the service through which the request is made.

In accordance with one or more aspects, a user permitted to access a resource is identified. A service through which the user is permitted to access the resource, and a type of access, are also identified. An access control entry is generated indicating that the user, through the service, is permitted that type of access to the resource.

BRIEF DESCRIPTION OF THE DRAWINGS

The same numbers are used throughout the drawings to reference like features.

DETAILED DESCRIPTION

Access control based on user and service is discussed herein. A request to access a resource on a computing device is received through a particular service. The resource can potentially be accessed through multiple different services (e.g., different programs or applications). An access control module restricts access to the resource based on both an identifier of a user associated with the request and the service through which access to the resource is requested. The access control module determines whether the requested access to the resource is permitted based on the identifier of the user and the service through which the resource is requested, and returns an indication of whether the requested access to the resource is permitted.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key.

Figure 1:
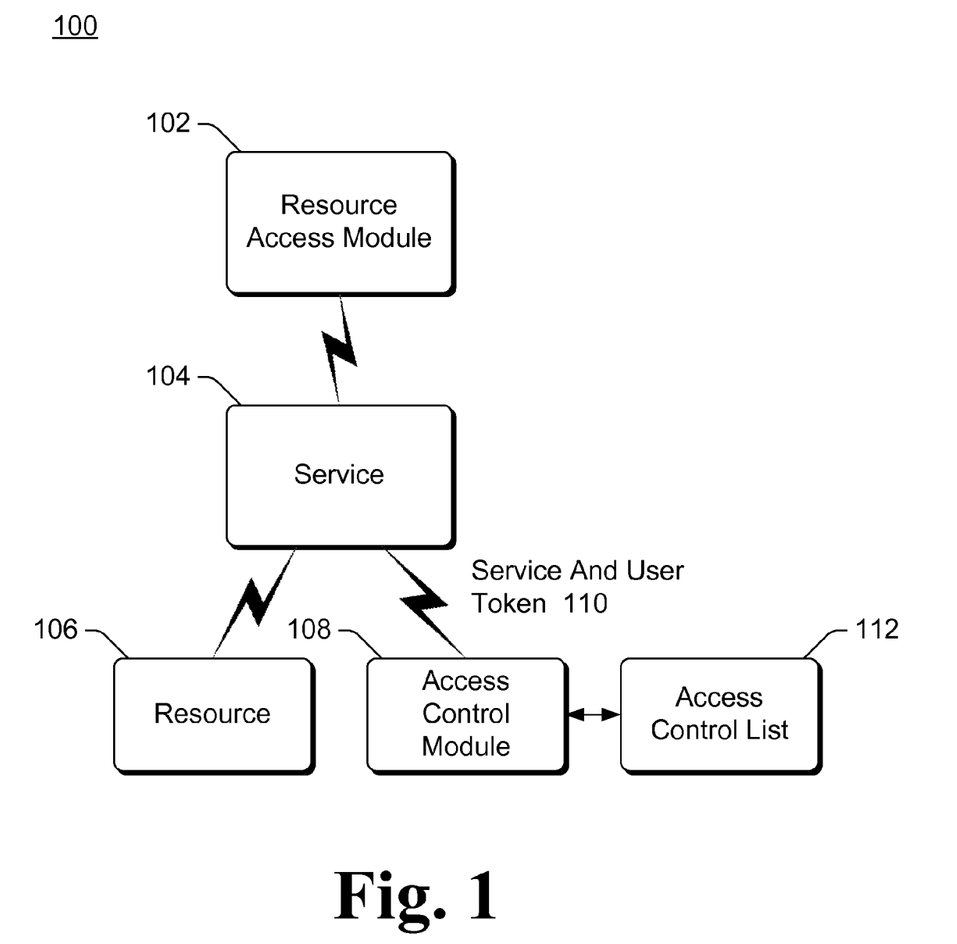
FIG. 1 is a block diagram illustrating an example system implementing the access control based on user and service in accordance with one or more embodiments.

FIG. 1 is a block diagram illustrating an example system 100 implementing the access control based on user and service in accordance with one or more embodiments. System 100 includes multiple components or modules, including a resource access module 102, a service 104, a resource 106, and an access control module 108. System 100 is implemented using one or more of a variety of different types of devices. For example, system 100 can be implemented using one or more of a desktop computer, a laptop or netbook computer, a mobile station, an entertainment appliance, a set-top box communicatively coupled to a display device, a television, a cellular or other wireless phone, an audio and/or video playback device, a game console, an automotive computer, and so forth. System 100 can be implemented using multiple devices. For example, resource access module 102 can be implemented in one device, while service 104 and resource 106 are implemented in a different device.

In situations where components or modules of system 100 are implemented in different devices, these different devices can communicate with one another via a network. These devices can communicate using one or more of a variety of different networks, including the Internet, a local area network (LAN), a public telephone network, an intranet, other public and/or proprietary networks, combinations thereof, and so forth. These different networks can include wired and/or wireless communication media.

System 100 includes a resource 106. A resource refers to a physical device or other component that can be accessed by a computing device and to which access is controlled. Examples of different types of resources include a file (e.g., storing data and/or instructions) in a file system, a table or entry in a database, a printer, an image capture device, a communication component (e.g., a network adapter or wireless communication program), and so forth.

A resource access module 102 requests access to resource 106 through service 104. The request to access resource 106 is associated with a particular user, which is typically a user that is authenticated to a device implementing (or communicating with) resource access module 102. The request to access resource 106 can be a request initiated by the user (e.g., a user request to open a data file), or alternatively can be a request initiated by a particular component or module. Regardless of the initiator of the request, the request is associated with a particular user. An identifier or other indication of this user is provided to service 104 (e.g., by resource access module 102 or alternatively another component or module).

It should be noted that the user associated with the request can be an entity other than a person. For example, the user can be a corporation or other business entity, another service, an application or program, and so forth. Regardless of the nature of the entity that is the user, an identifier or other indication of the user is provided to service 104.

Resource access module 102 communicates with service 104 to access resource 106. Service 104 is a program or application, running on a computing device, that can access resource 106 (subject to the particular types of access permitted by access control module 108). For a particular request to access resource 106, service 104 receives an identifier of the user associated with the request. This identifier can be received, for example, as a user token that has been authenticated by service 104 and/or another service that is trusted by service 104. Service 104 combines this identifier of the user with an identifier of service 104 to generate a service and user token 110 that is provided to access control module 108. Service and user token 110 thus identifies to access control module 108 both the user associated with the request to access resource 106 and the service 104 through which the access is requested.

Access control list 112 corresponds to resource 106. Access control list 112 includes an access policy identifying particular types of access that are permitted to particular users through particular services. Access control module 108 obtains (or otherwise accesses) access control list 112 and determines, based on the user associated with the request and the service 104 through which the access is requested (as identified in service and user token 110), whether the requested type of access to resource 106 is permitted. Based on this determination, an indication of whether the requested type of access to resource 106 is permitted is provided by access control module 108. This indication can be returned to service 104, or alternatively provided to another component or module (not shown), such as a component or module controlling or storing resource 106.

A variety of different types of access can be specified as permitted or not permitted in the access policy of access control list 112, and can vary based on the type of resource. For example, for a resource that is a file, the types of access that can be specified as permitted or not permitted can include the ability to read the file, the ability to write to the file, the ability to delete the file, the ability to rename the file, the ability to copy or move the file, the ability to encrypt or decrypt the file, and so forth. By way of another example, for a resource that is a printer, the types of access that can be specified as permitted or not permitted can include the ability to print to the printer, the ability to read configuration settings of the printer, the ability to write configuration settings to the printer, the ability to re-order jobs being printed by the printer, and so forth. By way of yet another example, for a resource that is an image capture device, the types of access that can be specified as permitted or not permitted can include the ability to capture an image, the ability to read configuration settings of the image capture device, the ability to write configuration settings to the image capture device, the ability to view images captured by the image capture device, and so forth.

Figure 2:
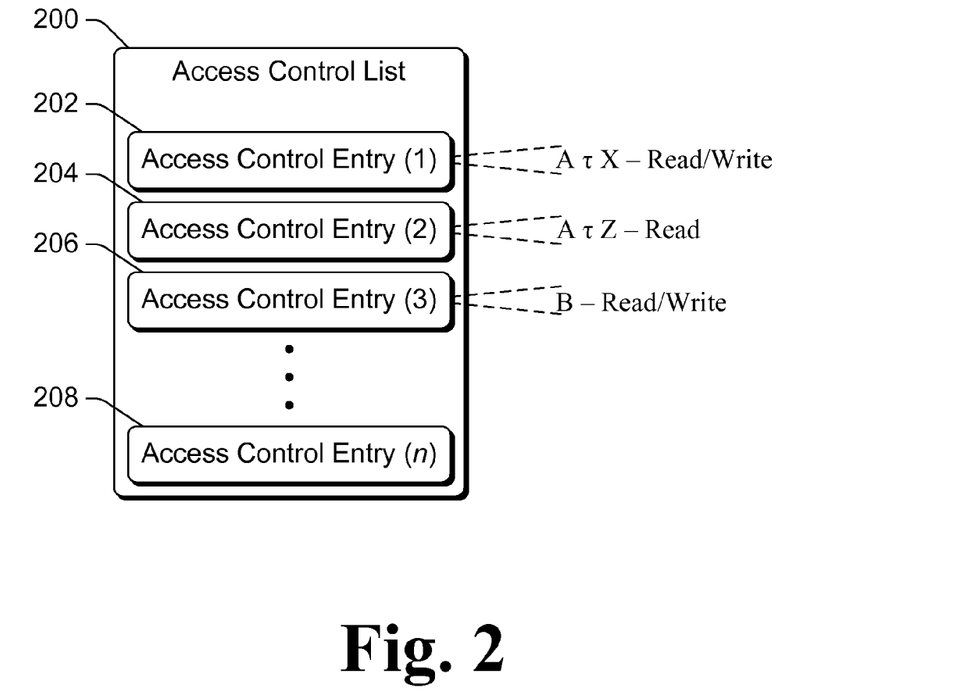
FIG. 2 illustrates an example access control list in accordance with one or more embodiments.

FIG. 2 illustrates an example access control list 200 in accordance with one or more embodiments. Access control list 200 includes multiple (n) access control entries 202, 204, 206, and 208. Access control list 200 can include one or more access control entries that define the access control policy for the same and/or different users.

Each access control entry corresponds to, and includes an identifier of, a particular user or group of users. Each access control entry also includes an identifier of one or more types of access to the resource that are permitted for the user, and can include a "through" operator and an identifier of a service through which the one or more types of access to the resource are permitted. For example, access control entry 202 indicates that user A through service X (denoted as "AτX", where "τ" signifies "through") is permitted Read/Write access to the resource. Access control entry 204 indicates that user A through service Z (denoted as "AτZ") is permitted Read access to the resource. Thus, the types of access that user A is permitted to the resource are read access and write access if the user is accessing the resource through service X, but just read access is permitted to the resource if the user is accessing the resource through service Z.

It should be noted that not all access control entries need identify a service. For example, access control entry 206 indicates that user B is permitted Read/Write access to the resource. As access control entry 206 does not specify a service through which user B is permitted access to the resource, the Read/Write access to the resource is permitted regardless of (or independent of) the service through which access is requested.

Thus, it is to be appreciated that access control list 200 can include access control entries that identify a user and a service through which the user is permitted to access the resource. Such access control entries can also be referred to as being dependent on a service because the access control entries identify the service through which the user is permitted to access the resource. Access control list 200 can also include access control entries that identify a user that is permitted to access the resource but do not identify any service through which the user is permitted to access the resource. In such situations, the access control module can use the access control entry to identify the access that is permitted to the user independent of any service (e.g., regardless of which service is used to access the resource).

It should be noted that although the example access control entries 202, 204, and 206 refer to a single user (user A or user B), an access control entry can also specify a group of users. Thus, access for any user that is a member of a particular group can be specified using an access control entry.

It should also be noted that although the example access control entries 202, 204, and 206 refer to a single service, an access control entry can also specify multiple services. Thus, access for a particular user or group of users through multiple services can be specified in an access control entry.

Figure 3:
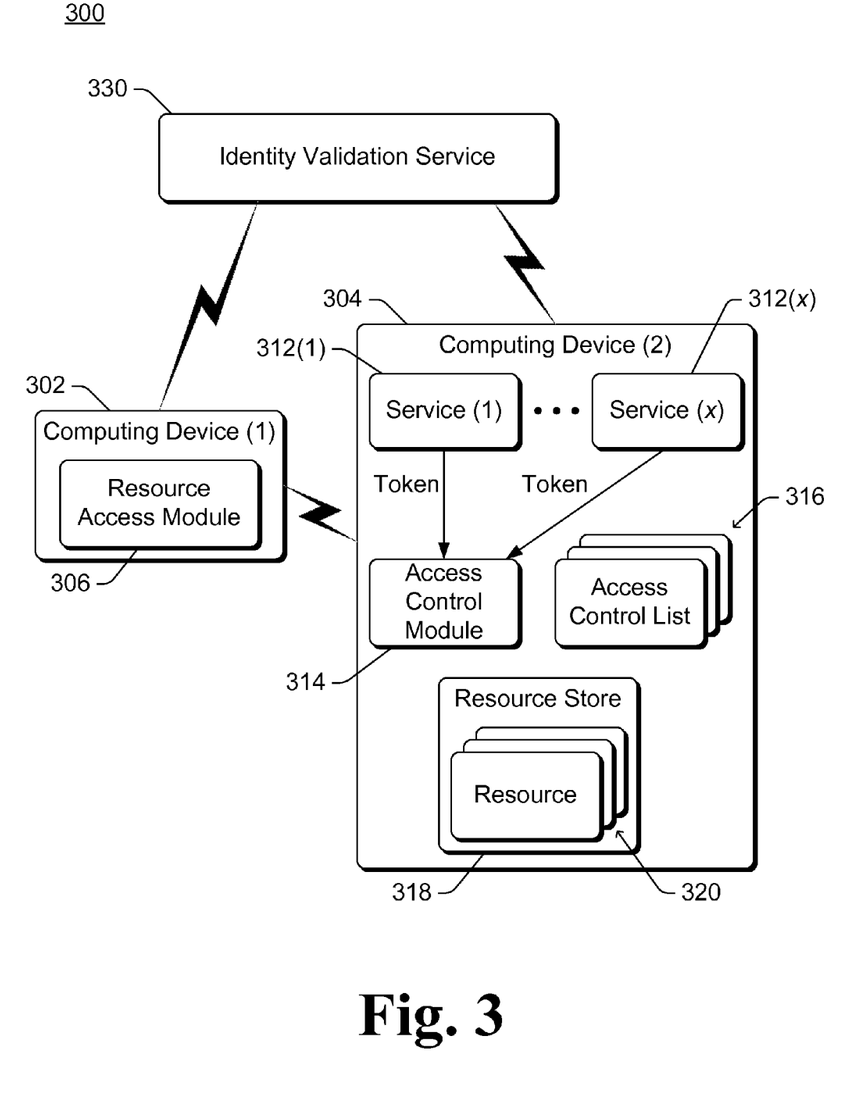
FIG. 3 is a block diagram illustrating another example system implementing the access control based on user and service in accordance with one or more embodiments.

FIG. 3 is a block diagram illustrating another example system 300 implementing the access control based on user and service in accordance with one or more embodiments. System 300 includes a computing device 302 and a computing device 304, each of which can be a variety of different computing devices analogous to the discussion above regarding FIG. 1. Computing device 302 includes a resource access module 306. Computing device 304 includes multiple (x)

services 312(1), ... 312(x), an access control module 314, one or more access control lists 316, and a resource store 318. System 300 is similar to system 100 of FIG. 1, including resource access module 306 (analogous to resource access module 102 of FIG. 1), services 312 (each analogous to a service 104 of FIG. 1), access control module 314 (analogous to access control module 108 of FIG. 1), and one or more access control lists 316 (each analogous to access control list 112 of FIG. 1).

Resource store 318 includes one or more resources 320, each analogous to a resource 106 of FIG. 1. Each resource 320 corresponds to an access control list 316. Each resource 320 can correspond to a different access control list 316, or alternatively multiple resources 320 can correspond to the same access control list 316 (and/or multiple access control lists 316 can correspond to the same resource 320).

Resources 320 are illustrated as being included in a resource store 318 of computing device 304. A resource can alternatively be included as a part of computing device 304 that is separate from resource store 318. A resource can also be a physically separate device from computing device 304 and/or included as part of (or stored on) another device that is physically separate from computing device 304, and coupled to computing device 304 in a wired or wireless manner (e.g., directly coupled to computing device 304 or coupled to computing device 304 via a network).

During operation, resource access module 306 communicates a request to access a resource 320. This request is communicated to one of services 312. As part of the request, resource access module 306 provides a user token or other identifier of the user associated with the request. Such a user token can be provided by computing device 302 itself, or alternatively can be provided by another component or module. In one or more embodiments, the user associated with the request is the user that is authenticated to computing device 302 (or another service, such as identity validation service 330 discussed below) at the time resource access module 306 communicates the request to access a resource 320. Alternatively, resource access module 306 can associate different users with the request (e.g., a default user for computing device 302, a user authenticated to computing device 302 at a time that a user request is made regardless of when module 306 communicates the request to access resource 320, and so forth).

In one or more embodiments, system 300 includes an identity validation service 330. Identity validation service 330 operates as a third party trusted by both computing device 302 and computing device 304. Computing device 302 (e.g., resource access module 306) provides user credentials to identity validation service 330 to prove the identity of a user of computing device 302. These user credentials can take a variety of different forms, such as a user id and password, a secret phrase or key, data from a smartcard or digital certificate, and so forth. Identity validation service 330 determines whether the user credentials are verified (e.g., the correct password corresponding to a user id is provided to identity validation service 330). If the user credentials are not verified then service 330 does not generate a user token on behalf of the user.

If the user credentials are verified then identity validation service 330 does generate a user token on behalf of the user. This user token includes one or more identifiers of the user. Each user can have multiple different identifiers, such as resulting from multiple different user credentials, based on different groups that the user is part of, and so forth. Any one or more of these identifiers could be included in an access control entry of an access control list corresponding to a resource. Service 330 also verifies the user token to computing device 304. This verification of the user token can take different forms, such as including a statement (e.g., including a digital certificate) in the token that the user token is verified by service 330, and digitally signing the user token with a private key of service 330. Accordingly, a service 312 can verify (e.g., based on a public key of identity validation service 330) that the user token is from 330 and can be trusted by the service 312. In one or more embodiments service 312 maintains a cache of user tokens received from service 330, and can subsequently obtain a user token from this cache rather than from service 330.

Alternatively, rather than identity validation service 330 providing the user token to computing device 304, the user token can be provided to computing device 304 in different manners. For example, identity validation service 330 can return the user token to computing device 302, which in turn can provide the user token to computing device 304.

To request a particular type of access to a particular resource 320, resource access module 306 communicates with a particular service 312 to request a particular type of access to a particular resource 320. The particular service 312 receives the request and verifies the user's identity (such as by receiving the user token). The user token can be received from a trusted third party (e.g., identity validation service 330), in which case particular service 312 trusts the user token as verifying the user identity (because service 312 trusts this third party). For example, the request received by the particular service 312 from the resource access module 306 can include an identifier of the user, and the particular service 312 can obtain, from identity validation service 330, a user token for that identified user.

Alternatively, the user token may be received from another service or module that service 312 may not trust. In such situations, service 312 verifies the user's identity. This verification can be performed in a variety of different manners based on the user providing user credentials (e.g., analogous to the discussion above regarding providing user credentials to service 330), based on digitally signed statements made by the user (e.g., and signed by another trusted third party), and so forth.

Alternatively, resource access module 306 can establish a secure communication channel between resource access module 306 and service 312 in a variety of different manners (e.g., using a symmetric key). As part of establishing the secure communication channel, a user identifier is provided and requests received via that secure communication channel are associated with that user identifier.

The particular service 312 that receives the request also provides a service token to access control module 314. This user token and service token together are referred to as the service and user token 110 of FIG. 1. In one or more embodiments the user token and service token are combined together into a single token by service 312. These tokens can be combined in a variety of different manners. For example, a hash value can be generated by applying a hash algorithm to the identifiers from the user token and the service token. By way of another example, the user token and service token can be deconstructed into their component parts and reconstructed into a single service and user token. E.g., if the user token has a user identifier of "1-2-88-1234", and the service token has a service identifier of "1-2-77-5678", then the single service and user token could have the identifier (user through service) "1-2-99-1234-5678", where the value "99" is understood to indicate that the single service and user token is constructed from "77" and "88". In general the "through" operator can be considered to be a "Cartesian product" of the two principle tokens (the user token and the service token) creating a combined access token. Alternatively, the user token and service token can be maintained separately (but as associated with one another) when provided to access control module 314.

Access control module 314 determines, based on the user identifier and service, whether the requested access to the particular resource 320 is permitted, analogous to the discussion above. An indication of whether the requested access is permitted can be provided to service 312, or alternatively can be provided to another component or module. It should be noted that access control module 314 can enforce the access policy for the particular resource 320, preventing the service 312 from accessing the particular resource 320 unless the requested access is permitted. Alternatively, access control module 314 can provide to another component or module an indication of whether the requested access to the particular resource is permitted to the particular resource 320, and this other component or module can prevent the service 312 from accessing the particular resource 320 unless the requested access is permitted.

In one or more embodiments, if the particular requested access to the resource is not permitted, access control module 314 returns an indication of one or more other services 312 through which the requested access is permitted. Whether the requested access is permitted through a different service 312 can be readily determined by access control module 314 based on the access control entries of the access control list 316 of the corresponding resource 320. This indication of one or more other services 312 through which the requested access is permitted can be returned to access control module 306, and can be displayed or otherwise presented to a user (or other initiator of the request). Thus, the user or other initiator of the request can subsequently attempt to obtain access to the resource through a different service.

It should be noted that whether the requested access to the resource by the user through the services is permitted is controlled by access control module 314. Service 312 can verify the particular user, such as by using a token received from identity validation service 330, by using a digital certificate received from resource access module 306, and so forth. However, service 312 need not determine or control whether the user is permitted to access the resource through service 312. Rather, the determination of whether the user is permitted to access the resource is made by access control module 314 regardless of which service the request is received through.

It should also be noted that both the user and the service are acting as authenticated principles on the computing devices 302 and 304, respectively, with an identity that is understood by their respective computing devices. As such, the terms user and service herein are to be interpreted broadly as labels of any entities or processes that are running on computing devices that create a combined token for access to a resource.

Figure 4:
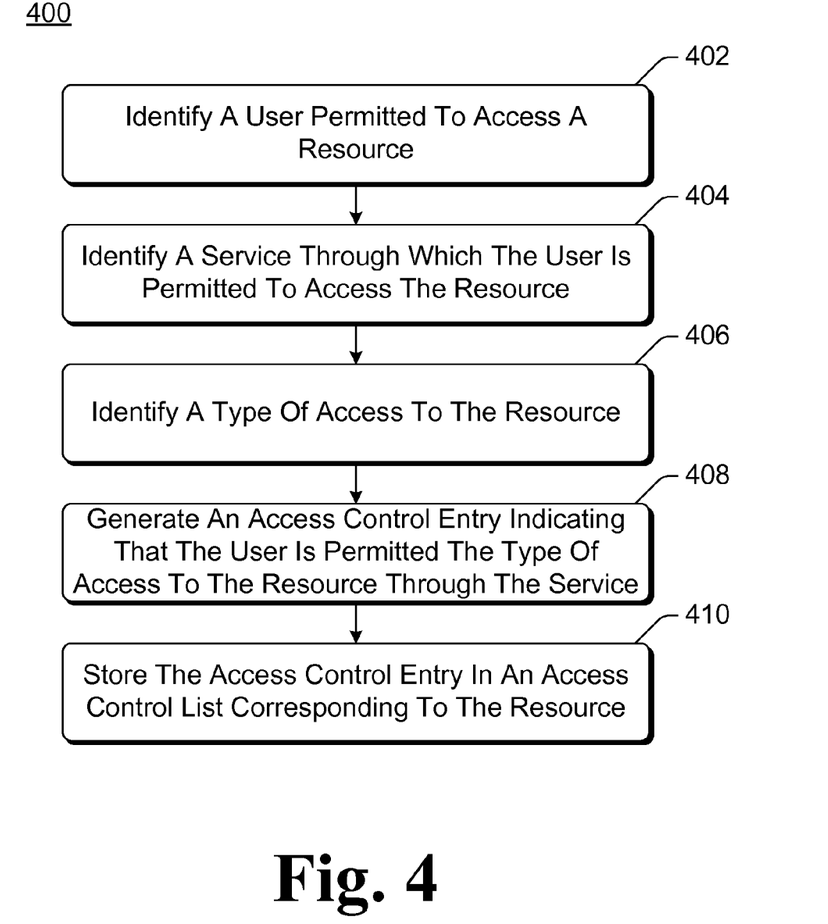
FIG. 4 is a flowchart illustrating an example process for generating access control entries in accordance with one or more embodiments.

FIG. 4 is a flowchart illustrating an example process 400 for generating access control entries in accordance with one or more embodiments. Process 400 is carried out by a device, such as computing device 304 of FIG. 3 or another device, and can be implemented in software, firmware, hardware, or combinations thereof. Process 400 is shown as a set of acts and is not limited to the order shown for performing the operations of the various acts. Process 400 is an example process for generating access control entries; additional discussions of generating access control entries are included herein with reference to different figures.

In process 400, a user permitted to access a resource is identified (act 402). This user can be identified in different manners, such as from a user input, from a component or module of the device implementing process 400, from a trusted third party, and so forth. This user can be a variety of different entities as discussed above.

A service through which the user is permitted to access the resource is also identified (act 404). This service can be identified in different manners, analogous to identification of the user in act 402.

A type of access to the resource is also identified (act 406). This type of access can be identified in different manners, analogous to identification of the user in act 402.

An access control entry indicating that the user identified in act 402 is permitted the type of access identified in act 406 through the service identified in act 404 is generated (act 408).

The access control entry is stored in an access control list corresponding to the resource (act 410). As discussed above, multiple access control entries can be included in the access control list.

Figure 5:
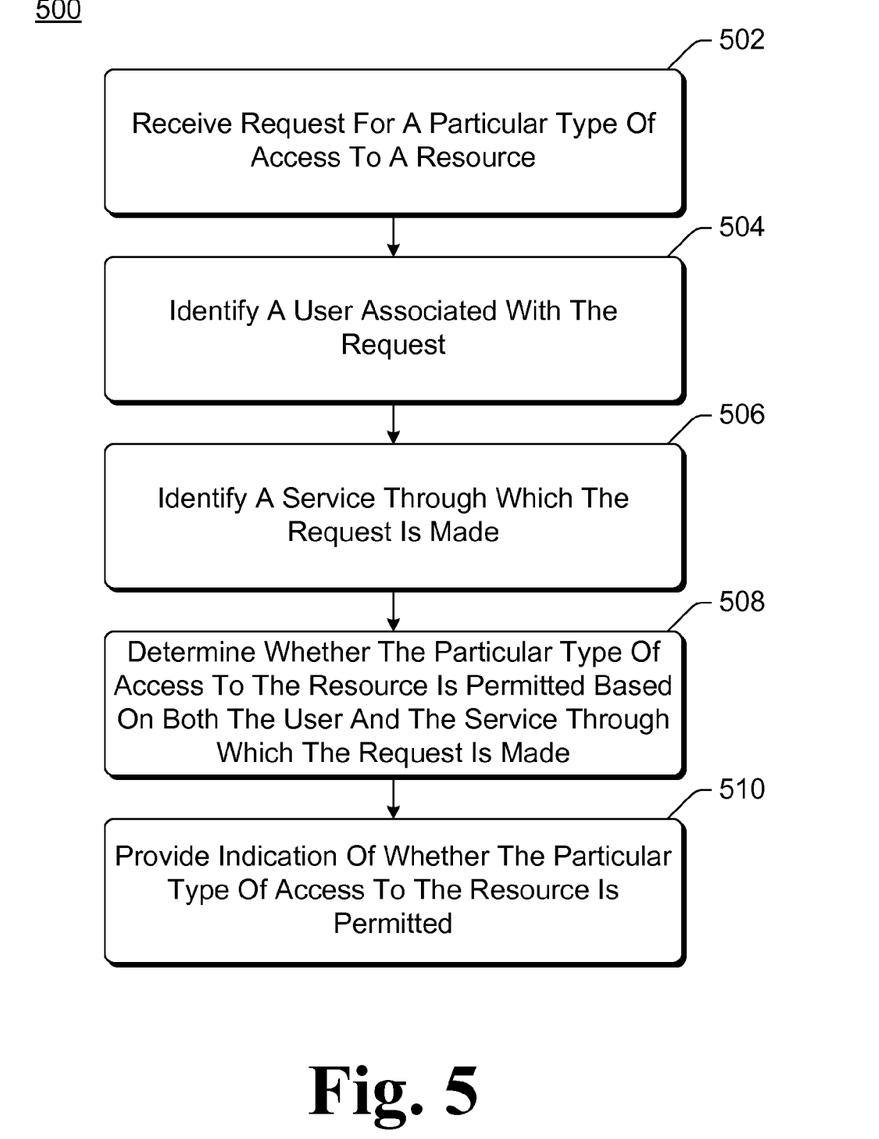
FIG. 5 is a flowchart illustrating an example process for access control based on user and service in accordance with one or more embodiments.

FIG. 5 is a flowchart illustrating an example process 500 for access control based on user and service in accordance with one or more embodiments. Process 500 is carried out by a device, such as computing device 304 of FIG. 3 or another device, and can be implemented in software, firmware, hardware, or combinations thereof. Process 500 is shown as a set of acts and is not limited to the order shown for performing the operations of the various acts. Process 500 is an example process for access control based on user and service; additional discussions of access control based on user and service are included herein with reference to different figures.

In process 500, a request for a particular type of access to a resource is received (act 502). As discussed above, this request can be received from a different device than the device implementing process 500, or can be received from a component or module of the device implementing process 500.

A user associated with the request for the particular type of access to the resource is identified (act 504). This user can be identified in different manners, such as from a user token, regardless of the initiator of the request.

A service through which the request for the particular type of access to the resource is made is also identified (act 506). This service can be identified in different manners, such as a service token (or service and user token) received from the service through which the request is made.

A determination is made as to whether the particular type of access to the resource is permitted based on both the user and the service through which the request is made (act 508). As discussed above, this determination is made based on the access control entries corresponding to the resource.

An indication of whether the particular type of access to the resource is permitted is provided (act 510). This indication can be provided to the service through which the access is requested, or alternatively can be provided to another component or module. Optionally, act 510 need not be performed. For example, a module of the device implementing process 500 can allow or not allow the requested access without providing an indication to another service, component, or module.

The access control based on user and service discussed herein provides for a variety of different usage scenarios. For example, users can be permitted different types of access to a resource through different services, such as to support different trust levels for the different services. By way of another example, a service through which users typically access their own resources (e.g., entries in a database) can be permitted one type of access, while a service through which an administrator manages the resources can be permitted a different type of access (e.g., allowing the administrator to manage the database but not read the data in the users' entries). By way of yet another example, different types of computing devices can access a resource through different services, such as a mobile computing device accessing a resource through a first service, a desktop computing device accessing the resource through a second service, and a television accessing the resource through a third service. As each of these different computing devices access the resource through different services, different access can be permitted to the same user based on which computing device he or she is using at the time (and thus through which service the resource is being accessed).

Additionally, the discussions herein refer to a resource access module requesting a particular type of access to a resource. It is to be appreciated that other access control mechanisms can be used with the access control based on user and service techniques discussed herein. For example, rather than requesting a particular type of access, a resource access module can request an indication of what types of access to a resource are permitted to the user through a particular one or more services. Based on the information in the access control list corresponding to the resource, an indication of what types of access to the resource are permitted to the user through a particular one or more services can be obtained and returned to the resource access module. By way of another example, rather than requesting a particular type of access, an indication of what types of access to a resource are permitted to the user through a particular one or more services can be obtained based on the information in the access control list corresponding to the resource. This indication can then be provided to another component or module (on the same or a different device) to permit or not permit access to the resource.

Figure 6:
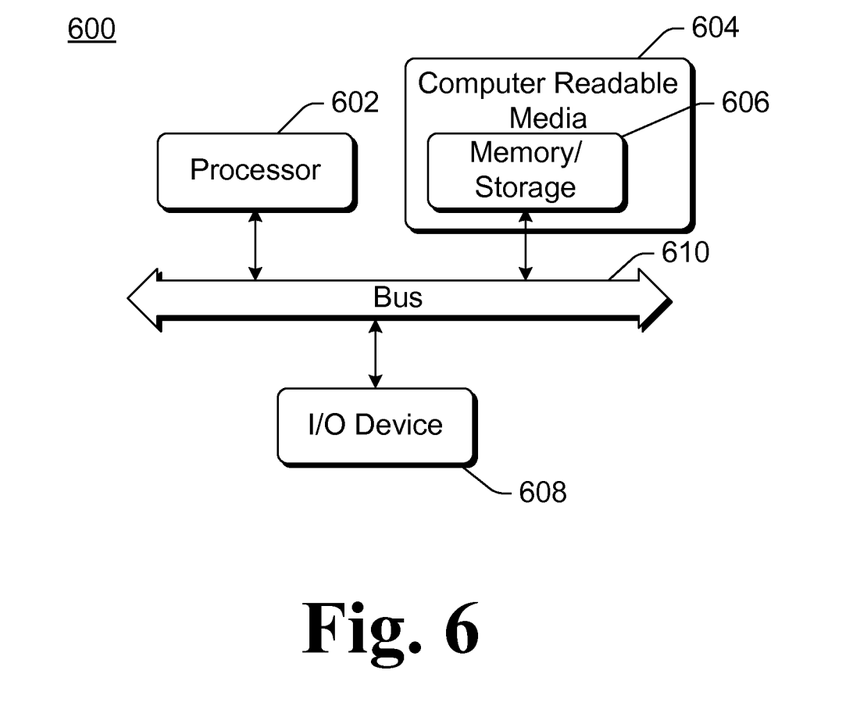
FIG. 6 illustrates an example computing device that can be configured to implement the access control based on user and service in accordance with one or more embodiments.

FIG. 6 illustrates an example computing device 600 that can be configured to implement the access control based on user and service in accordance with one or more embodiments. Computing device 600 can be, for example, a computing device 302 or 304 of FIG. 3, or can implement one or more of module 102, service 104, resource 106, access control module 108, and access control list 112 of FIG. 1.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the access control based on user and service techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a first computing device, the method comprising:
   identifying, via the first computing device, a user permitted to access a resource via a user token;
   identifying a service through which the user is permitted to access the resource via a service token;
   combining the user token and the service token into a single token by deconstructing the user token and the service token into a respective component part such that each respective part is reconstructed into the single token, the combined single token indicating the user permitted to access the resource and the service through which the user is permitted to access the resource;
   identifying a type of access to the resource without receiving a request for a particular type of access; and
   generating an access control entry indicating that the user, through the service, is permitted the type of access to the resource based, at least in part, on the combined single token.

2. A method as recited in claim 1, further comprising storing the access control entry in an access control list corresponding to the resource.

3. A method as recited in claim 2, wherein the access control list includes multiple access control entries, each of the multiple access control entries corresponding to the user, and each of the multiple access control entries corresponding to a different one of multiple services.

4. A method as recited in claim 2, wherein the access control list includes an additional access control entry corresponding to a different user, the additional access control entry being independent of any service.

5. A method as recited in claim 1, wherein both the resource and the service are included in the first computing device, and further comprising receiving the service token from an identity validation service of a second computing device.

6. A method as recited in claim 1, wherein the resource comprises a file in a file system of the first computing device.

7. A method as recited in claim 1, further comprising providing to another component or module an indication of whether a request to access the resource is permitted.

8. A method implemented in a first computing device, the method comprising:
   receiving a request for a particular type of access to a resource;
   identifying, via a user token, a user associated with the request;
   identifying, via a service token, a service through which the request is made, the service including a program or an application;
   combining, via the first computing device, the user token and the service token into a single token, the combining including deriving a single identifier for the single token from an identifier of the user token and an identifier of the service token;
   identifying, via the single identifier for the single token, both the user and the service in an access control entry of an access control list corresponding to the resource; and
   determining, using the access control entry, whether the particular type of access to the resource is permitted based at least in part on the combined single token that indicates both the user associated with the request and the service through which the request is made.

9. A method as recited in claim 8, wherein the access control list includes multiple access control entries, each of the multiple access control entries corresponding to the user, and each of the multiple access control entries corresponding to a different one of multiple services.

10. A method as recited in claim 8, wherein the access control list includes an additional access control entry corresponding to a different user, the additional access control entry being independent of any service.

11. A method as recited in claim 8, wherein identifying the user comprises obtaining an identifier of the user from the user token received from the service, and wherein identifying the service comprises obtaining an identifier of the service from the service token received from the service.

12. A method as recited in claim 8, wherein the user is authenticated to the service by a trusted third party.

13. A method as recited in claim 8, further comprising returning an indication to the service of whether the particular type of access to the resource is permitted.

14. A method as recited in claim 8, wherein the resource is included in the first computing device, the service is included in the first computing device, and receiving the request comprises receiving the request from a resource access module in a second computing device.

15. A method as recited in claim 8, wherein identifying the user associated with the request is based at least in part on the user token received by the service from an identity validation service trusted by the first computing device.

16. A method as recited in claim 8, wherein the combined single token is stored in an access control module of the first computing device.

17. A method as recited in claim 8, responsive to determining that the particular type of access to the resource is not permitted, presenting an indication of one or more other services through which the request is permitted.

18. A method as recited in claim 8, wherein the resource comprises a file in a file system of the first computing device.

19. A method as recited in claim 8, wherein the resource comprises an entry in a database of the first computing device.

20. One or more computer hardware storage media having stored thereon multiple instructions execution of which cause one or more processors of a computing device to:
   receive a request for access to a resource of the computing device via a first service, the first service including a program or an application;
   responsive to verification of user credentials associated with the request, generating a single operator for storage in an access control list indicative of a user permitted to access the resource and a first service through which the user is permitted to access the resource;
   determine, based at least in part on the single operator stored as a first access control entry of the access control list that corresponds to the resource, that access to the resource is not permitted via the first service;
   responsive to determining that access to the resource is not permitted via the first service, determine that access to the resource is permitted via a second service based on a second access control entry of the access control list that corresponds to the resource, the second access control entry identifying, as another single operator, both the user associated with the request and the second service; and
   provide an indication that the second service permits access to the resource.

21. A system comprising:
one or more modules implemented at least partially in hardware, the one or more modules configured to perform operations comprising:
- identifying, via the one or more modules, a user permitted to access a resource via a user token;
- identifying a service through which the user is permitted to access the resource via a service token;
- combining the user token and the service token into a single token by deconstructing the user token and the service token into a respective component part such that each respective part is reconstructed into the single token, the combined single token indicating the user permitted to access the resource and the service through which the user is permitted to access the resource;
- identifying a type of access to the resource without receiving a request for a particular type of access; and
- generating an access control entry indicating that the user, through the service, is permitted the type of access to the resource based, at least in part, on the combined single token.

22. A system comprising:
one or more modules implemented at least partially in hardware, the one or more modules configured to perform operations comprising:
- receiving a request for a particular type of access to a resource;
- identifying, via a user token, a user associated with the request;
- identifying, via a service token, a service through which the request is made, the service including a program or an application;
- combining, via the one or more modules, the user token and the service token into a single token, the combining including deriving a single identifier for the single token from an identifier of the user token and an identifier of the service token;
- identifying, via the single identifier for the single token, both the user and the service in an access control entry of an access control list corresponding to the resource; and
- determining, using the access control entry, whether the particular type of access to the resource is permitted based at least in part on the combined single token that indicates both the user associated with the request and the service through which the request is made.

23. A system comprising:
one or more modules implemented at least partially in hardware, the one or more modules configured to perform operations comprising:
- receiving a request for access to a resource of a computing device via a first service, the first service including a program or an application;
- responsive to verification of user credentials associated with the request, generating a single operator for storage in an access control list indicative of a user permitted to access the resource and a first service through which the user is permitted to access the resource;
- determining, based at least in part on the single operator stored as a first access control entry of the access control list that corresponds to the resource, that access to the resource is not permitted via the first service;
- responsive to determining that access to the resource is not permitted via the first service, determining that access to the resource is permitted via a second service based on a second access control entry of the access control list that corresponds to the resource, the second access control entry identifying, as another single operator, both the user associated with the request and the second service; and
- providing an indication that the second service permits access to the resource.

* * * * *